(12) United States Patent
Muthuvaradharajan

(10) Patent No.: US 9,703,607 B2
(45) Date of Patent: Jul. 11, 2017

(54) SYSTEM AND METHOD FOR ADAPTIVE CONFIGURATION OF SOFTWARE BASED ON CURRENT AND HISTORICAL DATA

(71) Applicant: Wipro Limited, Bangalore (IN)

(72) Inventor: Chandramohan Muthuvaradharajan, Hosur (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/926,439

(22) Filed: Oct. 29, 2015

(65) Prior Publication Data

US 2017/0083377 A1 Mar. 23, 2017

(30) Foreign Application Priority Data

Sep. 18, 2015 (IN) .......................... 4995/CHE/2015

(51) Int. Cl.
*G06F 9/50* (2006.01)
*G06F 17/30* (2006.01)

(52) U.S. Cl.
CPC ........ *G06F 9/5038* (2013.01); *G06F 17/3053* (2013.01)

(58) Field of Classification Search
CPC .................................................. G06F 9/5038
See application file for complete search history.

(56) References Cited

U.S. PATENT DOCUMENTS

| 7,437,703 | B2 | 10/2008 | Wu |
| 8,380,915 | B2 * | 2/2013 | Wood ..................... G11C 16/28 711/100 |
| 2005/0198636 | A1 * | 9/2005 | Barsness ............... G06F 9/4881 718/100 |
| 2015/0058843 | A1 * | 2/2015 | Holler ..................... G06F 9/455 718/1 |
| 2015/0127979 | A1 * | 5/2015 | Doppalapudi ...... G06F 11/0709 714/15 |
| 2016/0132372 | A1 * | 5/2016 | Anderson ............. G06F 11/079 714/15 |

* cited by examiner

Primary Examiner — Charlie Sun
(74) Attorney, Agent, or Firm — Finnegan, Henderson Farabow, Garrett & Dunner, LLP

(57) ABSTRACT

This disclosure relates to systems and methods for adaptive configuration of software based on current and historical data. In one embodiment, a method is disclosed, which comprises receiving first data that reflects a first status of an execution of a software task. The method further comprises determining, based on the first data, a first set of configurations to be provided for the execution of the software task, wherein each configuration of the first set of configurations is associated with a weight that reflects a statistic measurement of a prior status of an execution of the software task when the configuration is provided, and wherein the first set of configurations are ranked based on the weights. The method also comprises providing, based on the ranking, at least one of the first set of configurations for the execution of the software task.

21 Claims, 5 Drawing Sheets

200

| Tasks | Current Status |
|---|---|
| Task #1 | Running |
| Task #2 | Running |
| Task #3 | Fail |
| Task #4 | Running |

| 211 | 212 | 213 | 214 |
|---|---|---|---|
| Configurations for failure of task #3 | Inference for reason of failure | Weight | Timestamp |
| 1 | Insufficient queue capacity | 50 | 8/31/15, 13:00 |
| 2 | Insufficient CPU speed | 30 | 8/31/15, 13:00 |
| 3 | Invalid routing address | 20 | 8/31/15, 13:00 |

| 221 | 222 | 223 | 224 |
|---|---|---|---|
| Sub-configuration for configuration 1 | Sub-Inference for reason of failure | Weight | Timestamp |
| 1 | Wrong queue | 60 | 8/31/15, 13:00 |
| 2 | Network interface speed insufficient | 40 | 8/31/15, 13:00 |

FIG. 2C

SYSTEM AND METHOD FOR ADAPTIVE CONFIGURATION OF SOFTWARE BASED ON CURRENT AND HISTORICAL DATA

TECHNICAL FIELD

This disclosure relates generally to software configuration, and more particularly to a system and method for adaptive software configuration based on current and historical data.

BACKGROUND

Software systems, such as enterprise resource planning (ERP) and automated planning system (APS), typically execute numerous tasks daily. For example, ERP and ARP can facilitate the planning and performance of various activities, such as finance, sales, inventory management, purchasing, production, forecasting, supply network planning, etc., and the tasks are executed to complete the planning and/or performance of these activities. These tasks are typically executed in application servers. Successful completion of these tasks typically depend on various aspects, such as completion of prerequisite tasks, availability of prerequisite master data and/or transaction data, etc. However, the execution of these tasks can fail due to various reasons, and can seriously affect the performances of the aforementioned activities, and the performance of the system that executes these tasks can be seriously degraded as a result (e.g., the system can be become underutilized as a result of failed execution of the tasks). Conventionally, the resolution of failed tasks includes diagnosis for root cause of failure, and search for one or more configurations for the software system (e.g., providing one or more arguments to a software function, and/or execution of one or more additional steps) based on the diagnosis.

There are several technical problems with the conventional method of resolving failed tasks. First, the diagnosis and search of configurations to resolve a failed task can take a lot of time, which can severely affect the performance of time-critical tasks (and the system that executes these tasks). This is especially true when there are a large number of potential causes for the failure, and/or there are a large number of potential configurations to resolve the failure. Second, in a case where there is only limited time and/or resource provided to resolve the failure, there is a need to focus on a smaller set of potential resolutions, but that typically requires lengthy diagnosis.

SUMMARY

Embodiments of the present disclosure present technological improvements as solutions to one or more of the above-mentioned technical problems recognized by the inventors in conventional systems. For example, embodiments of the present disclosure may advantageously provide a system and a method for adaptive configuration of software based on current and historical data. Based on current and historical data that reflect statuses of execution of the software with one or more configurations, a set of candidate configurations can be determined. A configuration can also be determined based on the current and historical data. With such arrangements, the solution space for implementing a target status change in the execution of the software (e.g., to resolve a failed task, to restart a failed task, to change the flow of execution, etc.) can be reduced, and the status change can be implemented more efficiently, which also improves the performance of the computer system that executes the software.

In one embodiment, a computer-implemented method of adaptive configuration for software execution is disclosed. The method comprises receiving first data that reflects a first status of an execution of a software task, determining, based on the first data, a first set of configurations to be provided for the execution of the software task, wherein each configuration of the first set of configurations is associated with a weight that reflects a prior status of an execution of the software task when the configuration was provided, and wherein the first set of configurations are ranked based on the weights, and providing, based on the ranking, at least one of the first set of configurations for the execution of the software task.

In another embodiment, a system for adaptive configuration for software execution is disclosed. The system comprises one or more hardware processors, and one or more memory units storing instructions executable by the one or more hardware processors. When executed, the instructions cause the one or more hardware processors to perform a method. The method comprises receiving first data that reflects a first status of an execution of a software task, determining, based on the first data, a first set of configurations to be provided for the execution of the software task, wherein each configuration of the first set of configurations is associated with a weight that reflects a prior status of an execution of the software task when the configuration was provided, and wherein the first set of configurations are ranked based on the weights, and providing, based on the ranking, at least one of the first set of configurations for the execution of the software task.

In yet another embodiment, a non-transitory computer-readable medium is disclosed, storing computer-executable instructions. When executed, the instructions cause the one or more hardware processors to perform a method. The method comprises receiving first data that reflects a first status of an execution of a software task, determining, based on the first data, a first set of configurations to be provided for the execution of the software task, wherein each configuration of the first set of configurations is associated with a weight that reflects a prior status of an execution of the software task when the configuration was provided, and wherein the first set of configurations are ranked based on the weights, and providing, based on the ranking, at least one of the first set of configurations for the execution of the software task.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 2A-2C are charts depicting examples of historical and current data that reflect the execution statuses of software according to some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide improved methods and systems for adaptive software configuration based on current and historical data. The disclosed embodiments may receive first data that reflects a first status of an execution of a software task. The disclosed embodiments may determine, based on the first data, a first set of configurations to be provided for the execution of the software task, wherein each configuration of the first set of configurations is associated with a weight that reflects a prior status of an execution of the software task when the configuration was provided, and wherein the first set of configurations are ranked based on the weights. The disclosed embodiments may provide, based on the ranking, at least one of the first set of configurations for the execution of the software task.

Figure 1:
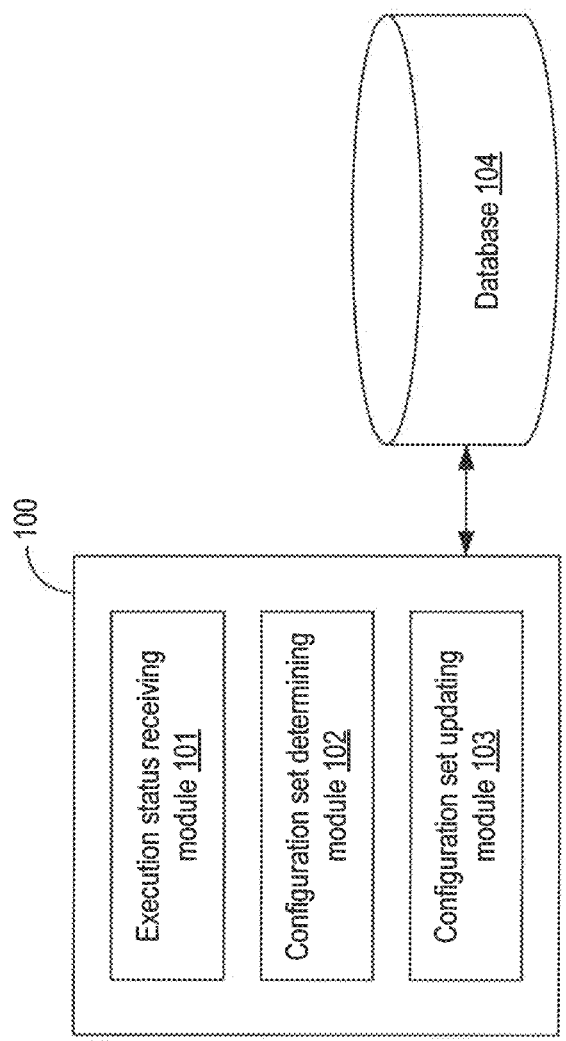
FIG. 1 is a functional block diagram of an example system for adaptive software configuration according to some embodiments of the present disclosure.

Accordingly, it may be advantageous to provide methods and systems for improved adaptive software configuration based on current and historical data. Such a system can, for example, integrate with various ERP/APS systems, trigger jobs, detect and identify failure of jobs in ERP/APS system, infer a solution for the failure based on historical outcomes of providing the inferred solution, and trigger the failed jobs with the inferred solution provided. The provided methods and systems advantageously allow a set of software configurations to be selected based on current and historical data that reflect statuses of execution of the software associated with the set of configurations. As a result, implementation of change of a status of execution (e.g., to resolve a failed execution of a task) can be performed more efficiently and accurately. The performance of a computer system that executes the software can also be improved. FIG. 1 depicts an example system 100 for adaptive software configuration based on current and historical data, consistent with embodiments of the present disclosure. Adaptive software configuration system 100 may include an execution status receiving module 101, a configuration set determining module 102, a configuration set updating module 103, and a database 104. It will be appreciated from this disclosure that the number and arrangement of these components is exemplary only and provided for purposes of illustration. Other arrangements and numbers of components may be utilized without departing from the teachings and embodiments of the present disclosure.

In some embodiments, execution status receiving module 101 is configured to receive one or more execution statuses of a software task. The statuses can reflect, for example, whether the execution of the software task has halted due to a failure, whether an execution of the software task has completed or in progress, and/or one or more outputs (e.g., text, graphics, etc.) generated during the execution of the software task, etc. In some embodiments, the statuses can be represented by data that include, for example, log files generated during the execution of the software task, resources usage by the software task, etc.

In some embodiments, data that reflect the historical and current execution statuses of the software task can be stored in database 104, and the data can then be acquired by execution status receiving module 101. Reference is now made to FIG. 2A, which illustrates an example chart 200 that stores one or more execution statuses (e.g., whether the task is running or has failed) associated with a plurality of software tasks. In some embodiments, data that indicate the statuses can be received by execution status receiving module 101 from, for example, a system that executes the software task (e.g., a processor). The received data can then be stored in database 104.

Referring back to FIG. 1, in some embodiments, configuration set determining module 102 is configured to determine a configuration for the execution of the software task, and provide the determined configuration to another hardware component (e.g., a processor) that is configured to execute the software task. The determination can be made based on, for example, data that reflects the execution status of the task received by execution status receiving module 101, as well as an association between one or more pre-stored configurations and one or more historical execution statuses of the task.

Reference is now made to FIG. 2B, which illustrates an example chart 210 that associates a set of configurations 211 with, for example, failure of task #3 of FIG. 2A. The set of configurations 211 can include, for example, settings of a firmware to perform a pre-defined task (e.g., firmware configuration of a router to facilitate the routing of data packets). The set of configurations 211 can also include various parameters to be provided as inputs to perform a computation. Each of configurations 211 can also be associated with an inference for reason of failure 212, which can indicate a relationship between a set of configuration and a type of failure to be solved by the configuration. As an illustrative example, assuming that software task #3 concerns about routing a data packet to facilitate a communication, and the task fails. Chart 210 lists three possible reasons of failures, as indicated by inference for reason of failure 212: 1) insufficient queue capacity (which causes the packet to be dropped and not routed); 2) insufficient CPU power (which causes the packet to be dropped after being queued for too long); and 3) invalid routing address. As another illustrative example, in a case where the software is related to a production data structure (PDS) b, the set of configurations 211 can include solutions addressed to the following inconclusive list of failures: material prerequisite to be activated before the step of execution that leads to the failure, components are maintained as nil to be corrected, production version missing, variant missing, activity nodes to be corrected, unit of measurement for input nodes to be corrected, activity node duration missing, activity resource not found, recursive BOM (Bill of Material), etc.

Each inferred reason can be associated with a configuration targeted at the reason of failure. For example, configuration 1 can include increasing the queue size, configuration 2 can include sending the task to a different machine with increased CPU speed, and configuration 3 can include replacing the invalid routing address with a valid one. As another illustrative example (not shown in FIG. 2A), software task #3 can also concern about management of a production line at a factory, and the configurations can include, for example, activating part of the production line, providing product information, etc.

In some embodiments, as shown in FIG. 2B, each of the set of configurations 211 can also be associated with a weight 213. In some embodiments, a weight can reflect a rate of success of applying the associated configuration 211 to resolve prior failures. With the configuration 211 also being associated with interference for reason of failure 212, the weight can also be configured to reflect, when a failure occur, a probability that the failure is actually caused by the reason as indicated by the associated inference 212. In some embodiments, as to be described below, when the associated configuration is found to resolve a failure, the weight can be updated. For example, the weight can be increased when the failure is resolved with the associated configuration, and decreased when the failure is not resolved with the associated configuration, or vice versa. With such arrangements, the weight can then be configured to reflect a number of times the failure was resolved with the associated configuration in the past.

In some embodiments, configurations 211 can be ranked according to the associated weights 213. In some embodiments, the rank can determine a sequence of providing the configurations to the software when, for example, a failure occurs. As an illustrative example, as indicated in chart 210, configuration 1 can be ranked as the highest based on that its weight (50) is the highest among the configurations in chart 210, while configuration 3 can be ranked as the lowest based on that its weight (20) is the lowest. As a result, when the execution of software task #3 of FIG. 2A fails, configuration 1 can be provided as a first attempt to resolve the failure. In some embodiments, as to be discussed below, if configuration 1 fails to resolve the failure, configuration 2 can be provided as a second attempt, followed by configuration 3 as a third attempt. In some embodiments, a combination of configurations can also be provided simultaneously based on an aggregate weight and/or rank.

Optionally, in some embodiments, a combination of the configurations 211, inference for reason of failure 212, and weight 213 can also be associated with a timestamp 214, which can be configured to indicate a time at which the weight is updated (or simply stored) based on a result of applying the configuration. In some embodiments, the timestamps enable binning of the weights with respect to time, and/or to generate a pattern of weights with respect to time. Based on the timestamps, statistical analysis (e.g., calculating an average, variance, etc. within a period of time) can be performed over the weights. As described above, the weight can be configured to reflect a rate of success of resolving a task failure with a configuration. A variance of the weight can reflect an accuracy of using the weight to predict the rate of success of resolving a task failure. In some embodiments, the timestamp can also be considered as additional parameters to determine which of the pre-stored configurations is to be selected, and to improve the accuracy of predicting, as indicated by the weight, the likelihood of success of resolving a failure with the selected configuration. For example, using the illustrative example of FIG. 2B, if a weight of 50 has been consistently determined when applying configuration 1 (e.g., increasing queue size) to solve a routing failure on every day at 13:00, it is more likely that a weight of 50 accurately measures the likelihood of success (e.g., 50%) of resolving the routing failure with configuration 1 on a particular day at 13:00. In some embodiments, the selection of a configuration can also be based on a result of the statistical analysis (e.g., variance) of the weights associated with the configuration.

In some embodiments, a configuration can also be associated with a set of sub-configurations. Reference is now made to FIG. 2C, which illustrates an example chart 220 that associates a set of sub-configurations 221 with, for example, configuration 1 of FIG. 2B. As an illustrative example, when an inference of insufficient queue capacity for reason of failure is determined, that inference can be further associated with additional inferences (e.g., sub-inference 222). For example, the reason behind insufficient queue capacity can be due to, for example, the packet being queued at a wrong queue (e.g., a queue that is designated to process packets for other tasks), or that the network interface speed is insufficient in removing the packets. As shown in FIG. 2C, each sub-inference 222 can be associated one of sub-configurations 221 (e.g., in a case of wrong queue, sub-configuration 1 can include routing the packet to the designated queue). Each of sub-configurations 221 can also be associated with a weight and a timestamp, similar to configurations 211 of FIG. 2B. Sub-configurations 221 can also be ranked based on the associated weights, which can also determine an order at which each sub-configuration is provided in an attempt to resolve the failure of software task #3.

Referring back to FIG. 1, in some embodiments, data that represent charts 200, 210, and 220 of FIGS. 2A-2C can be stored at database 104. Configuration set determining module 102 can also acquire some of the aforementioned data from database 104 and, based on the received execution status of the software, determine a set of configuration (and/or a configuration from the determined set) based on the received status. For example, if, based on chart 200, configuration set determining module 102 determines that task #3 fails, it can retrieve chart 210 based on the chart's association with failure of task #3 and determine a set of configurations accordingly. Configuration set determining module 102 can then determine to provide configuration 1 of chart 210 as a first attempt to resolve the failure, based on its ranking.

In some embodiments, after configuration 1 of chart 210 is applied, execution status receiving module 101 can receive a second execution status of the software. If the second status indicates a failure, configuration set determining module 102 can determine to provide configuration 2 of chart 210 as a second attempt. Alternatively, configuration set determining module 102 can also determine to provide sub-configuration 1 of chart 220, which is associated with configuration 1 of chart 210, as a second attempt. Configuration set determining module 102 can determine to provide sub-configuration 1 as a second attempt based on various factors, such as an overwhelmingly large value of weight associated with a configuration.

For example, as discussed before, a weight associated with a configuration can also be configured to reflect, when a failure occur, a probability that the failure is actually caused by the inferred reason of failure targeted by that configuration. As an illustrative example, if "insufficient queue capacity" of FIG. 2B is associated with an overwhelmingly large weight (e.g. 90%), such a weight can indicate that when a routing failure occurs, there is a 90% chance that the failure is due to insufficient queue capacity. Under such a scenario, it may be desirable to continue the search of resolution in a space of sub-configurations that is associated with a configuration (e.g., configuration 1) targeted at insufficient queue capacity. As a result, in such a scenario, configuration set determining module 102 can determine to provide sub-configuration 1 of chart 220 as the second attempt, instead of providing configuration 2 of chart 210.

In some embodiments, configuration set updating module 103 is configured to provide and/or update the configurations stored at database 104, as well as the attributes (e.g., weights, timestamp, etc.) associated with the configurations as reflected in, for example, charts 210 and 220 of FIGS. 2B and 2C. For example, configuration set updating module 103 can receive a new configuration from a third party (e.g., another software application, a user, etc.). Configuration set updating module 103 can also associate the new configuration with a pre-defined status (e.g., a job failure). Configuration set updating module 103 can also associate the new configuration with a weight that reflects a number of times the configuration was successful in bringing a target status change (e.g., to resolve a job failure). Configuration set updating module 103 can also update the weight based on whether the configuration was successful in bringing that target status change when the pre-defined status occurs. In some embodiments, the weight can be either increased or decreased if the configuration was found to be successful.

Figure 3A:
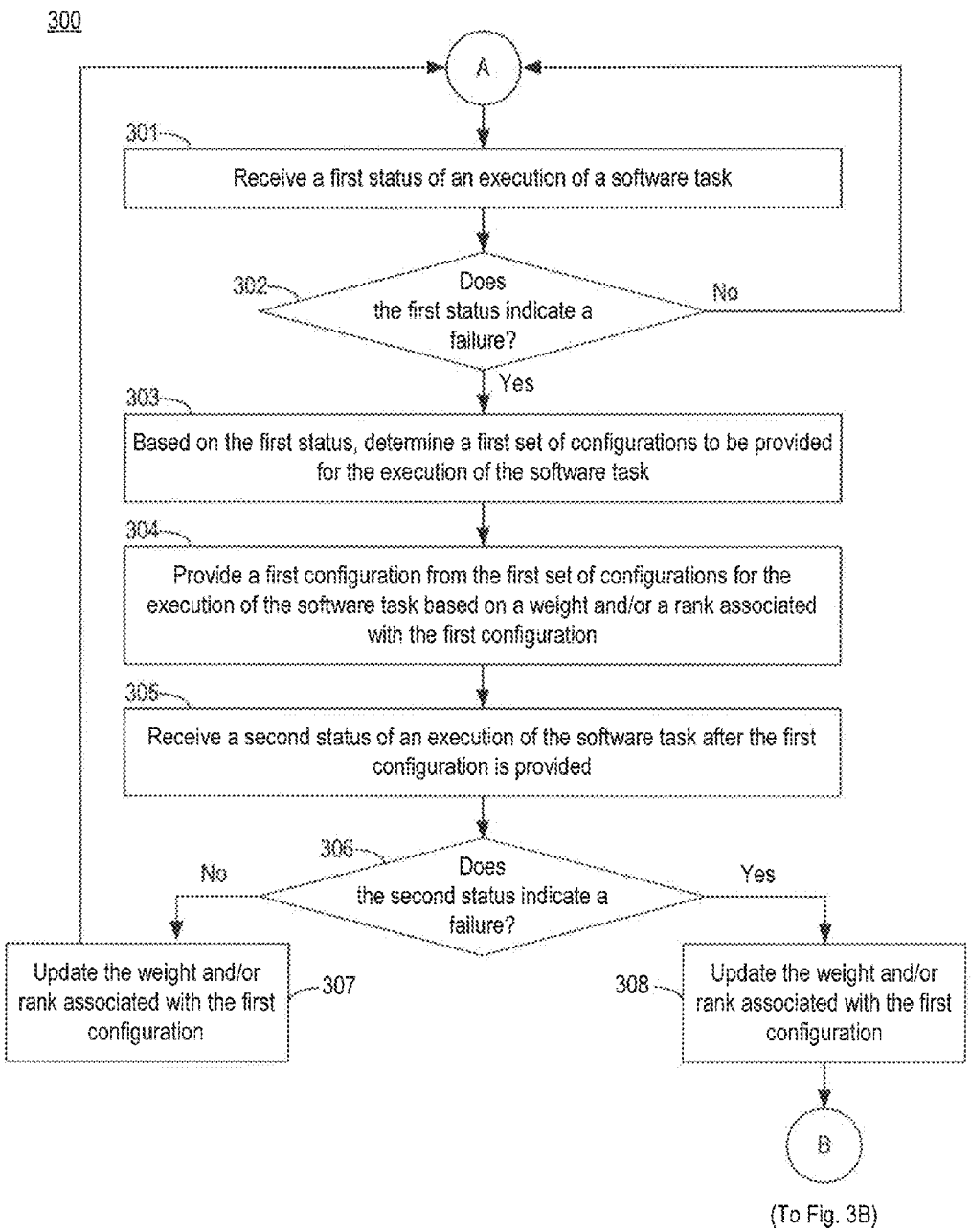
FIGS. 3A and 3B are flowcharts illustrating an example method for adaptive software configuration according to some embodiments of the present disclosure.
Figure 3B:
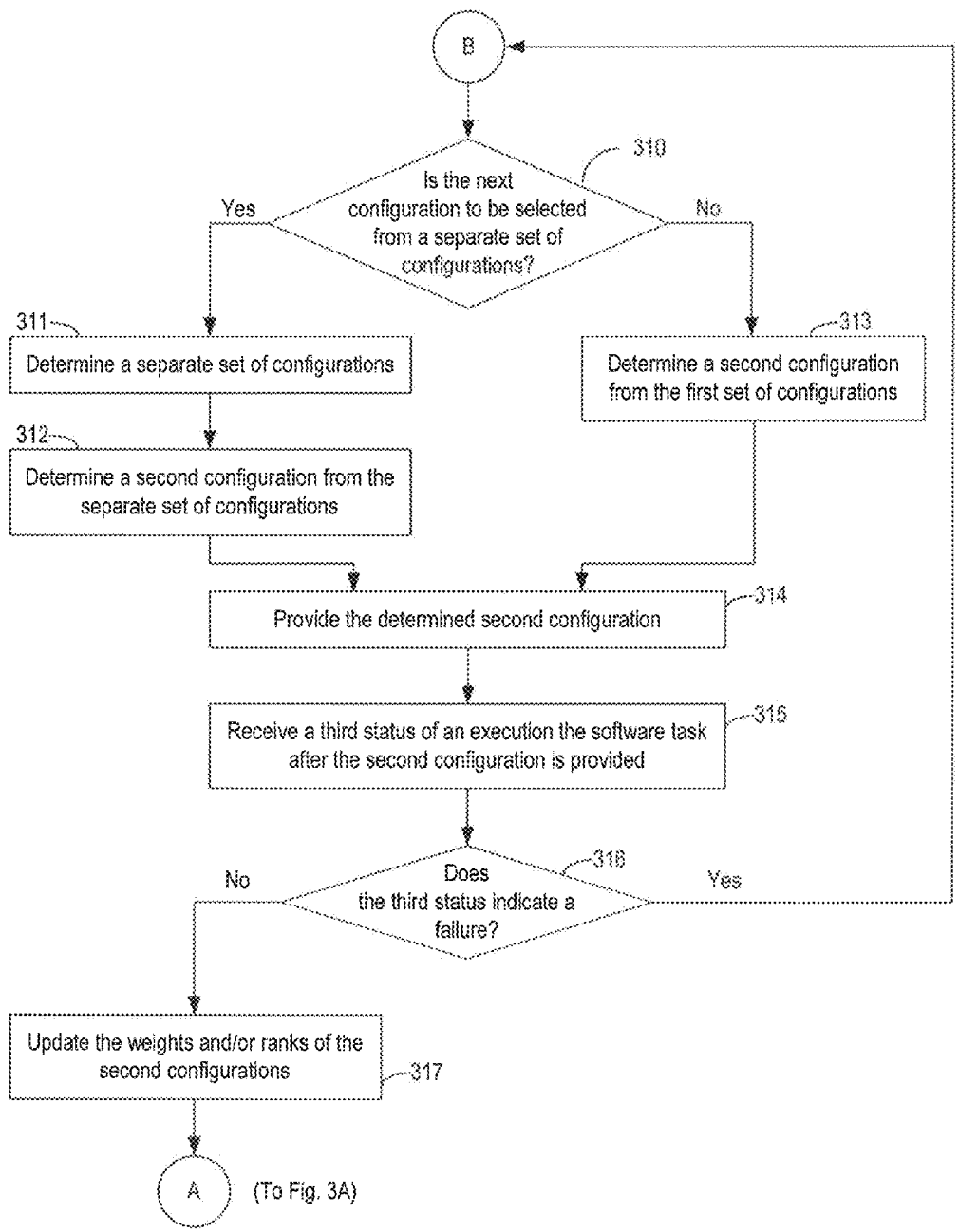

FIGS. 3A and 3B depict an example method 300 for adaptive configuration of software based on current and historical data, according to embodiments of the present disclosure. In some embodiments, method 300 may be implemented as one or more computer programs executed by one or more processors. Moreover, in some embodiments, at least part of method 300 may be it implemented by an adaptive configuration system (e.g., adaptive configuration system 100) having one or more processors executing one or more computer programs stored on a non-transitory computer readable medium.

Reference is now made to FIG. 3A. In step 301, the system may receive a first status of an execution of a software task (e.g., task #3 of FIG. 2A). The first status can indicate, for example, whether the execution of the software task has halted due to a failure, whether the execution has completed or in progress, and/or one or more outputs (e.g., text, graphics, etc.) generated during the execution of the software task, etc. In some embodiments, the statuses can be represented by data that include, for example, outputs generated during the execution of the software task, resources usage by the software task, etc. In some embodiments, step 301 can be performed by, for example, execution status receiving module 101 of FIG. 1, and data that represent the first status can be stored in database 104 of FIG. 1 in a format similar to chart 200 of FIG. 2A.

If the first status is determined to be not a failure (step 302), the system may go back to step 301 to receive the next execution status of the software task. On the other hand, if the first status is determined to indicate a failure in step 302, the system may determine, based on the first status, a first set of configurations to be provided for the execution of the software task, in step 303. In some embodiments, the first set of configurations can be determined based on an association between the set of configuration and a particular task status, such as the association as illustrated in chart 210 of FIG. 2B. In some embodiments, the first set of configurations can be stored in, for example, database 104 of FIG. 1 in a format similar to chart 210 of FIG. 2B.

In step 304, the system may provide a first configuration form the first set of configurations (determined in step 303) for the execution of the software task. For example, the system may provide the first configuration to a processor configured to execute the software task. In some embodiments, the first configuration may be selected based on a weight and/or rank associated with the configuration. As discussed above, in some embodiments, a weight can be assigned to a configuration to indicate, for example, a likelihood that the configuration can bring about a targeted status change (e.g., to resolve a task failure). The set of configurations can then be ranked based on their associated weights (e.g., largest weight or smallest weight ranks first), and a first configuration can be selected based on the rank. For example, in step 304, the system may select a configuration that is associated with the highest weight as a first attempt to resolve the software task failure.

In some embodiments, if each of the first set of configuration is associated with identical weight, the first configuration can be selected by, for example, executing a random function and the selection can be made based on a result of the random function. In some embodiments, if the first set of configuration includes only one configuration, that configuration can be provided. Optionally, if the first status is not associated with any configuration, a message of "no solution" can be generated and transmitted.

In step 305, the system may receive a second status of an execution of the software task after the first configuration is provided. The second status may indicate, for example, whether the failure is resolved. In some embodiments, step 305 can be performed by, for example, execution status receiving module 101 of FIG. 1, and data that represent the second status can also be stored in database 104 of FIG. 1 in a format similar to chart 200 of FIG. 2A.

If the second status is determined to be not a failure (step 306), the system may execute step 307 to update the weight and/or rank associated with the first configuration. For example, the system may increase (or reduce) the weight of the first configuration to reflect that the first configuration (and the inferred reason of failure associated with it) is correctly applied to resolve the failure. The ranking can also be updated based on the updated weight. In some embodiments, as discussed above, the weights can also be associated with timestamps, and the timestamps can also be updated to reflect the correct application of the first configuration to resolve the failure. In some embodiments, step 307 can be performed by configuration set updating module 103 of FIG. 1, and the updated data can be stored at database 104 of FIG. 1.

On the other hand, if the second status is determined to indicate a failure in step 306, the system may proceed to step 308 to update the weight and/or rank associated with the first configuration to reflect that the first configuration (and the inferred reason of failure associated with it) is incorrectly applied, and hence failed to resolve the failure. The system can then proceed to step 310 of FIG. 3B. In step 310, the system may determine whether the next configuration to be provided, as a second attempt to resolve the task failure, is to be selected from a separate set of configuration. As discussed before, the determination can be based on various factors. For example, if the weight associated with the first configuration is overwhelmingly large compared with other configurations, the system may determine to find the next configuration from a separate set of configurations. Such a separate set of configurations can be, for example, targeted at a set of inferred reasons of failure that is related to the inferred reason of failure associated with the first configuration, such as the sub-configurations of chart 220 as illustrated in FIG. 2C.

If it is determined that the next configuration is to be selected from a separate set of configurations (in step 310), a separate set of configuration will be determined in step 311. The determination can be made based on, for example, a relationship between the inferred reasons of failure associated with the separate set of configurations and the inferred reason of failure associated with the first configuration. In step 312, a second configuration can be determined from the separate set of configurations. The determination can be based on, for example, the weight and/or rank associated with the second configuration.

On the other hand, if it is determined that the next configuration is to be selected from the first set of configurations in step 310, a second configuration can then be determined from the first set, in step 313. For example, the second configuration can be the configuration that is ranked second behind the first configuration based on weight.

After the second configuration is determined, the system may then provide the determined second configuration for the execution of the software task, in step 314. The system may then receive a third status after the second configuration is provided, in step 315.

If the third status is determined to be not a failure (step 316), the system may update the weights and/or the ranks of the first and second configurations, in step 317. For example, the weight of the first configuration may be reduced to reflect that it failed to resolve the software task failure, while the weight of the second configuration may be increased to reflect that it was correctly applied, which leads to a resolution. On the other hand, if the third status is determined to be a failure in step 316, the system may go back to step 310 to determine the next configuration. In some embodiments, steps 310 through 314 can be implemented by configuration set determining module 102, step 315 can be implemented by execution status receiving module 101, while step 317 can be implemented by configuration set updating module 103.

With embodiments of the present disclosure, when a pre-defined status of a software execution is detected (e.g., failure), a configuration can be determined to bring about a target status change (e.g., to resolve the failure). The determination can be based on a weight that reflects a result of applying the configuration when the pre-defined status occurred at prior times, which can improve the accuracy of estimation of likelihood of success. With such arrangements, the solution space for implementing the target status change can also be reduced, and the status change can be implemented more efficiently, which also improves the performance of the computer system that executes the software.

Computer System

Figure 4:
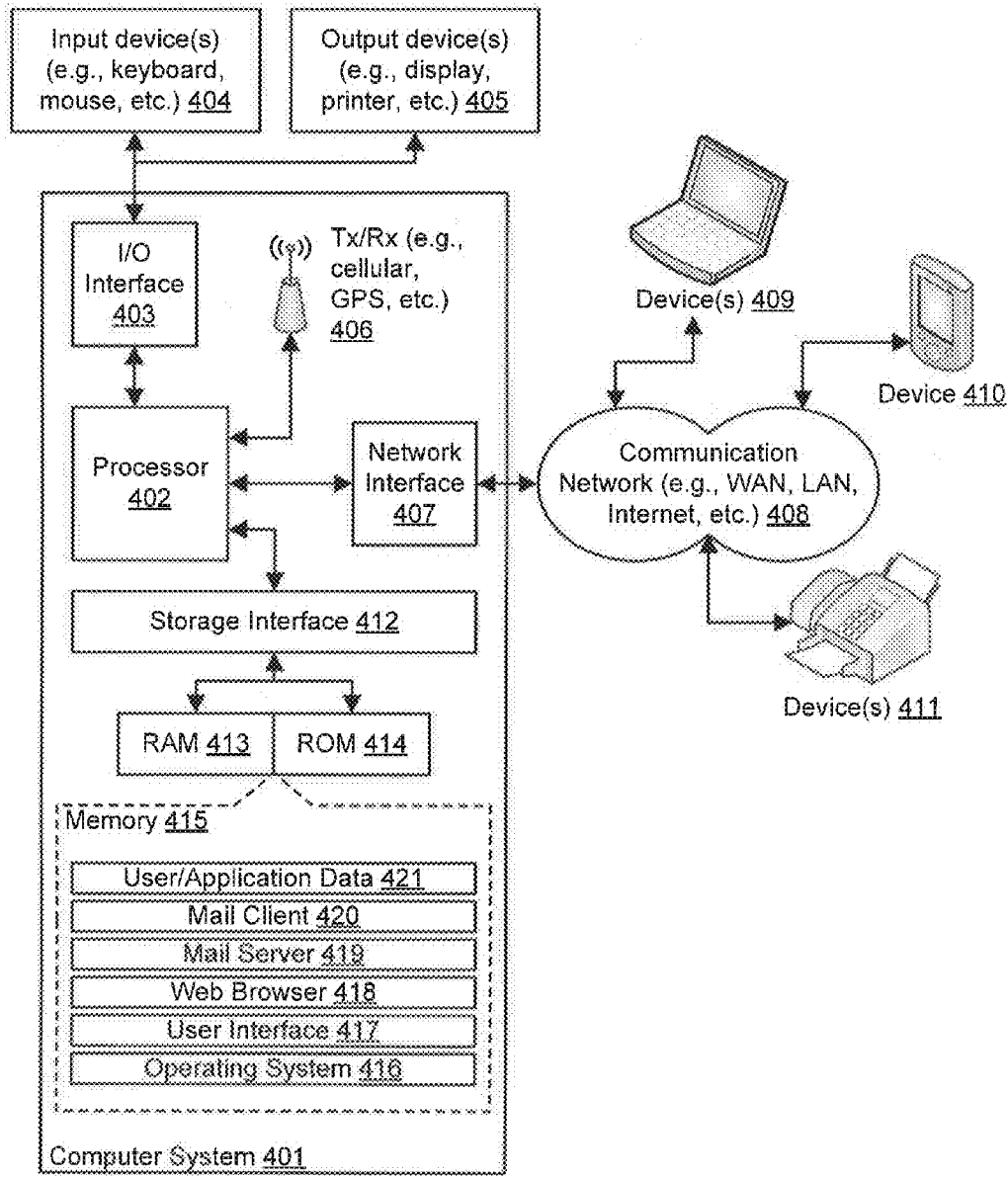
FIG. 4 is a block diagram of an example computer system for implementing embodiments consistent with the present disclosure.

FIG. 4 is a block diagram of an exemplary computer system for implementing embodiments consistent with the present disclosure. Variations of computer system 401 may be used for implementing, for example, execution status receiving module 101, configuration set determining module 102, and configuration set updating module 103 of FIG. 1. Computer system 401 may comprise a central processing unit ("CPU" or "processor") 402. Processor 402 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, knowledge base 160 of FIG. 1.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, strollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., configuration and analytic results of the first-level filtering provided by data adaptor 110, analytical reports of the second-level filtering provided by data filtration and funneling engine 120, and reports on recommended clustering and classification techniques provided by recommendation module 133, etc.) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described system and a method for improved knowledge mining. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals. i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:
1. A computer-implemented method of adaptive software execution, comprising:
    steps to improve performance of a computer system that executes a plurality of software tasks by;

receiving, by one or more hardware processors, first data that reflect a first status of a first execution of a software task from the plurality of software tasks;

determining, by the one or more hardware processors based on the first data, a first set of configurations for the first execution of the software task, the first set of configurations including a first configuration associated with a first weight and a second configuration associated with a second weight; wherein the first weight and the second weight reflect, respectively, a status of a prior execution of the software task with the first configuration and the second configuration, and wherein the first set of configurations are ranked based on the first weight and the second weight;

determining a sequence of executions of the software task with the first configuration and the second configuration based on the first weight and the second weight;

performing, by the one or more hardware processors, the first execution of the software task with the first configuration according to the sequence;

receiving, by the one or more hardware processors, second data that reflect a second status of the first execution of the software task with the first configuration;

determining, by the one or more hardware processors based on the second data, whether to perform a second execution of the software task with the second configuration according to the sequence; and updating the first weight based on the second data.

2. The method of claim 1, wherein the first set of configurations is included in a plurality of sets of configurations including a second set of configurations.

3. The method of claim 2, further comprising:
determining, by the one or more hardware processors based on an updated first weight, a third configuration from the second set of configurations; and
performing, by the one or more hardware processors, a third execution of the software task with the third configuration.

4. The method of claim 2, wherein each of the plurality of sets of configurations is also associated with a weight; wherein the first set of configurations is determined based on the weight associated with the first set of configurations.

5. The method of claim 1, wherein each of the first weight and the second weight is associated with a timestamp that indicates a time when the each of the first weight and the second weight is updated.

6. The method of claim 5 wherein a determination of performing the first execution with the first configuration is based on the first weight, and a relationship between the timestamp associated with the first weight and a current time.

7. The method of claim 1, wherein if each of the first weight and the second weight associated with the first set of configurations is equal, the at least one configuration of the first set of configurations is provided for the first execution based on a result of a random function.

8. A system of adaptive software execution, comprising:
one or more hardware processors; and
one or more memory units storing instructions executable by the one or more hardware processors to perform a set of steps to improve performance of a computer system that executes a plurality of software tasks by:
receiving, by one or more hardware processors, first data that reflect a first status of a first execution of a software task from the plurality of software tasks;
determining, by the one or more hardware processors based on the first data, a first set of configurations for the first execution of the software task, the first set of configurations including a first configuration associated with a first weight and a second configuration associated with a second weight; wherein the first weight and the second weight reflect, respectively, a status of a prior execution of the software task with the first configuration and the second configuration, and wherein the first set of configurations are ranked based on the first weight and the second weight;
determining a sequence of executions of the software task with the first configuration and the second configuration based on the first weight and the second weight;
performing, by the one or more hardware processors, the first execution of the software task with the first configuration according to the sequence;
receiving, by the one or more hardware processors, second data that reflect a second status of the first execution of the software task with the first configuration;
determining, by the one or more hardware processors based on the second data, whether to perform a second execution of the software task with the second configuration according to the sequence; and
updating the first weight based on the second data.

9. The system of claim 8, wherein the first set of configurations is included in a plurality of sets of configurations including a second set of configurations.

10. The system of claim 9, further storing the instructions to perform the set of steps to improve performance of the computer system that executes the plurality of software tasks by:
determining, based on the updated first weight, a third configuration from the second set of configurations; and
performing a third execution of the software task with the third configuration.

11. The system of claim 8, wherein each of the first weight and the second weight is associated with a timestamp that indicates a time when the each of the first weight and the second weight is stored or updated.

12. The system of claim 11, wherein a determination of performing the first execution with the first configuration is based on the first weight, and a relationship between the timestamp associated with the first weight and a current time.

13. The system of claim 8, wherein if each of the first weight and the second weight associated with the first set of configurations is equal, at least one configuration of the first set of configurations is provided for the first execution based on a result of a random function.

14. The system of claim 8, wherein each of the plurality of sets of configurations is also associated with a weight; wherein the first set of configurations is determined based on the weight associated with the first set of configurations.

15. A non-transitory computer-readable medium storing computer-executable instructions to implement a method of adaptive software execution, the method comprising:
steps to improve performance of a computer system that executes a plurality of software tasks by;
receiving, by one or more hardware processors, first data that reflect a first status of a first execution of a software task from the plurality of software tasks;
determining, by the one or more hardware processors based on the first data, a first set of configurations for the first execution of the software task, the first set of configurations including a first configuration associated with a first weight and a second configuration associated with a second weight; wherein the first weight and the second weight reflect, respectively, a status of a prior execution of the software task with the first configuration and the second configuration, and wherein the first set of configurations are ranked based on the first weight and the second weight;

determining a sequence of executions of the software task with the first configuration and the second configuration based on the first weight and the second weight;

performing, by the one or more hardware processors, the first execution of the software task with the first configuration according to the sequence;

receiving, by the one or more hardware processors, second data that reflect a second status of the first execution of the software task with the first configuration;

determining, by the one or more hardware processors based on the second data, whether to perform a second execution of the software task with the second configuration according to the sequence; and updating the first weight based on the second data.

16. The medium of claim 13, wherein the first set of configurations is included in a plurality of sets of configurations including a second set of configurations.

17. The medium of claim 16, wherein the method further comprises:

determining, based on a updated first weight, a third configuration from the second set of configurations; and performing a third execution of the software task with the third configuration.

18. The medium of claim 16, wherein each of the plurality of sets of configurations is also associated with a weight; wherein the first set of configurations is determined based on the weight associated with the first set of configurations.

19. The medium of claim 13, wherein each of the first weight and the second weight is associated with a timestamp that indicates a time when the each of the first weight and the second weight is updated.

20. The medium of claim 18, wherein a determination of performing the first execution with the first configuration is based on the first weight, and a relationship between the timestamp associated with the first weight and a current time.

21. The medium of claim 13, wherein if each of the first weight and the second weight associated with the first set of configurations is equal, at least one configuration of the first set of configurations is provided for the first execution based on a result of a random function.

* * * * *